United States Patent
Yoshida et al.

[11] Patent Number: 5,803,993
[45] Date of Patent: Sep. 8, 1998

[54] OUTER RING FOR HIGH STRENGTH CONSTANT VELOCITY JOINT AND PRODUCTION PROCESS FOR SAME

[75] Inventors: Kazuhiko Yoshida; Tatsuhiro Goto; Akira Wakita, all of Iwata; Toshio Kawasaki, Kobe; Toyofumi Hasegawa, Kobe; Hideo Takeshita, Kobe; Toshiki Suwa, Kobe, all of Japan

[73] Assignee: NTN Corporation, Iwata, Japan

[21] Appl. No.: 733,186

[22] Filed: Oct. 17, 1996

[30]    Foreign Application Priority Data

Oct. 17, 1995  [JP]  Japan ................................. 7-268745
Sep. 5, 1996   [JP]  Japan ................................. 8-235547

[51] Int. Cl.⁶ ............................ C22C 38/04; C22C 38/06; C21D 8/00
[52] U.S. Cl. .......................... 148/320; 148/328; 148/573; 148/587; 148/588; 148/651
[58] Field of Search ................................. 148/320, 328, 148/573, 587, 588, 651

[56]    References Cited

U.S. PATENT DOCUMENTS 2,774,106  12/1956  Bethe .
3,181,199   5/1965  Voelker .
4,201,321   5/1980  Patzelt et al. .

FOREIGN PATENT DOCUMENTS 0078340   5/1983  European Pat. Off. .
0645226   3/1995  European Pat. Off. .
0683027  11/1995  European Pat. Off. .
405017822  1/1993  Japan ................................. 148/587
406158170  6/1994  Japan ................................. 148/587
170880     1/1992  Russian Federation ............ 148/587
96/00644   1/1996  WIPO .

Primary Examiner—Deborah Yee
Attorney, Agent, or Firm—Fish & Richardson P.C.

[57]    ABSTRACT

The present invention provides an outer ring for a high strength constant velocity joint which has an excellent torsional strength and torsional fatigue strength and can provide an improved processability, and a process for producing the same. An outer ring used for a high strength constant velocity joint having an involute serration part and a screw part, the outer ring made of a steel containing:

C: 0.45 to 0.53%, Si: 0.05 to 0.25%, Mn: 0.7 to 1.0%, Al: 0.01 to 0.05%, Mo: 0.2 to 0.4%, N: 0.003 to 0.012%, the remainder being Fe and inevitable impurities, the inevitable impurities including:

Cr: 0.05% or less than 0.05%, P: 0.015% or less than 0.015%, S: 0.01% or less than 0.01%, and O: 0.002% or less than 0.002%, wherein an old austenite crystal grain at the involute serration end is 8 or more in JIS grain size classification; a surface hardness at the end is 720 or more in Hv; and a ratio (CD/R) is 0.35 to 0.60 where CD is an effective hardened layer depth at which a hardness at the end is 450 in Hv and R is a radius of a shaft part.

4 Claims, 1 Drawing Sheet

OUTER RING FOR HIGH STRENGTH CONSTANT VELOCITY JOINT AND PRODUCTION PROCESS FOR SAME

BACKGROUND OF THE INVENTION

1. Field of the Invention

The present invention relates to an outer ring used for a high strength constant velocity joint which has an involute serration (hereinafter abbreviated merely as serration) having a high torsional strength and torsional fatigue strength, and a process for producing the outer ring for the high strength joint.

2. Description of the Related Art

In general, an outer ring for a constant velocity joint as a power transmission part for automobiles is manufactured by fabricating a steel of JIS S48C, JIS S53C or the like into a prescribed form and high frequency hardening (or also referred to as induction hardening) and tempering it.

In recent years, as a demand for a reduction in weight for purposes of a reduction in fuel consumption and a reduction in exhaust gas in automobiles increases, further increase in a strength has come to be required to the power transmission part described above. Various proposals have so far been made in order to meet such needs for an increase in a strength. Proposed in, for example, Japanese Unexamined Patent Publication No. 4-141521 is a process for producing a high frequency-hardened part having a shaft form in which a ratio t/r, wherein an effective hardened layer depth t to a part radius r, is 0.4 to 0.7, by fabricating a steel having a specified chemical composition into a specified shaft form and subsequently high frequency hardening and tempering the same. Further, it is disclosed as well in this publication that a steel is subjected to a shot peening treatment after high frequency hardening to improve a torsional strength of a shaft part.

However, the technique disclosed in the publication described above refers only to a torsional strength and gives no consideration on characteristics such as a processability and a torsional fatigue strength essentially important to power transmission parts.

Conventional power transmission parts produced from steels of JIS S53C and the like have a torsional strength (hereinafter abbreviates as $\tau_{max}$) of about 1600 MPa and have a limit of about 660 MPa in a torsional fatigue strength (hereinafter abbreviates as $\tau_w$) at 100,000 cycles. However, these strength levels can not meet needs for a reduction in a weight and an increase in a strength in recent years, and power transmission parts which can provide higher $\tau_{max}$ and $\tau_w$ have been desired. As power transmission parts increase in a strength, a processability represented by a forging tool life, a cutting tool life and a serration rolling dimensional accuracy is notably reduced, and therefore an improvement in the processability is also an important subject at present.

SUMMARY OF THE INVENTION

It is therefore an object of the invention to overcome the aforementioned drawback in the conventional technology. The present invention is intended to provide a power transmission part which is further improved in a torsional fatigue characteristic and provides excellent torsional characteristics of a 1800 MPa level or higher in terms of $\tau_{max}$ and a 760 MPa level or higher in terms of $\tau_w$, which have not been obtained from conventional steels, and which can meet needs in recent days and has an excellent processability. In particular, this invention is aimed to produce an outer ring used for a high strength constant velocity joint having a serration part, and formulate a process for producing the above outer ring for a high strength constant velocity joint.

The outer ring of the present invention for a high strength constant velocity joint having an involute serration part and a screw part, the outer ring made of a steel contains:

C: 0.45 to 0.53%, Si: 0.05 to 0.25%, Mn: 0.7 to 1.0%, Al: 0.01 to 0.05%, Mo: 0.2 to 0.4%, N: 0.003 to 0.012%, the remainder being Fe and inevitable impurities, the inevitable impurities including:

Cr: 0.05% or less than 0.05%, P: 0.015% or less than 0.015%, S: 0.01% or less than 0.01%, and O: 0.002% or less than 0.002%, wherein an old austenite crystal grain at the involute serration end is 8 or more in JIS grain size classification; a surface hardness at the end is 720 or more in Hv; and a ratio (CD/R) is 0.35 to 0.60 where CD is an effective hardened layer depth at which a hardness at the end is 450 in Hv and R is a radius of a shaft part.

Further, it is effective that in this outer ring for a high strength constant velocity joint, surface compression residual stresses at both ends of the involute serration part described above are controlled to 850 MPa or higher, and this can further raise a torsional fatigue strength of the outer ring for a constant velocity joint.

In producing the outer ring for a high strength constant velocity joint described above comprises the steps of:

forging a steel including C: 0.45 to 0.53%, Si: 0.05 to 0.25%, Mn: 0.7 to 1.0%, Al: 0.01 to 0.05%, Mo: 0.2 to 0.4%, N: 0.003 to 0.012%, and the remainder being Fe and inevitable impurities and the impurities including Cr: 0.05% or less, P: 0.015% or less, S: 0.01% or less, and O: 0.002% or less at temperatures in a range of 850° to 950° C. to turn the steel into a crude fabricating material having a regulated fine grain structure, then subjecting said material to cold forging, cutting work and rolling work to fabricate the material into a specified form having an involute serration part and a screw part and then, subjecting the involute serration part to high frequency hardening and tempering to control an old austenite crystal grain at an involute serration end to 8 or more in a JIS grain size number and a surface hardness at said end to 720 or more in HV and set a ratio (CD/R), where CD is an effective hardened layer depth in which a hardness at said end is 450 in HV and R is a shaft part radius, 0.35 to 0.60.

In order to control a surface compression residual stress at both ends of the involute serration part in the outer ring of the present invention for a high strength constant velocity joint to 850 MPa or higher, a process for producing an outer ring for a high strength constant velocity joint made according to the aforementioned steps further comprises the steps of:

a first shot peening both ends of an involute serration part in the outer ring for a high strength constant velocity joint in a condition with shot grains having a grain hardness of 750 or more in HV and a grain diameter of 0.5 to 1 mm at a shot grain shooting rate of 60 m/sec or more and then, a second shot peening said both ends to the shot peening in a condition with shot grains having a grain hardness of 750 or more in HV and a grain diameter in a range of 0.2 to 0.5 mm which is smaller in size than the grains used in the first shot peening step.

The above and other features and advantages of the present invention will become more apparent upon reading of the following description with reference to the drawings.

DETAILED DESCRIPTION OF THE PREFERRED EMBODIMENT OF THE INVENTION

Figure 1:
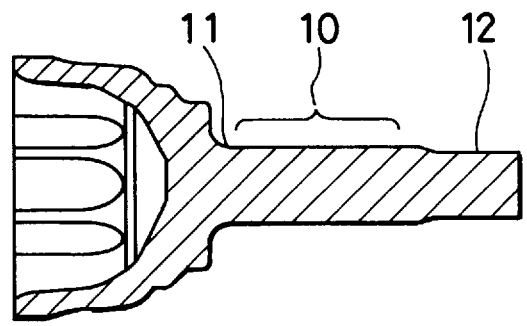
FIG. 1 is a cross sectional view of a crude fabricating material for an outer ring for a constant velocity joint.

In this description, JIS grain size classifications are defined according to Table A below.

TABLE A

JIS Grain Size Classification

| Grain Size Number (N) | Number of Crystal Grains in Area of 1 mm² (n) | Average Sectional Area of Crystal Grain (mm²) |
|---|---|---|
| −3 | 1 | 1 |
| −2 | 2 | 0.5 |
| −1 | 4 | 0.25 |
| 0 | 8 | 0.125 |
| 1 | 16 | 0.0625 |
| 2 | 32 | 0.0312 |
| 3 | 64 | 0.0156 |
| 4 | 128 | 0.00781 |
| 5 | 256 | 0.00390 |
| 6 | 512 | 0.00195 |
| 7 | 1024 | 0.00098 |
| 8 | 2048 | 0.00049 |
| 9 | 4096 | 0.000244 |
| 10 | 8192 | 0.000122 |

The number (n) of austenite crystal grains in a unit sectional area of 1 mm² is represented by $n=2^{N+3}$, wherein N denotes grain size number. (Japanese Industrial Standard, Category No. G, 0551-1997.)

In order to solve the problems described above, the present inventors have intensively investigated effects which are exerted on $\tau_{max}$ and $\tau_w$ of the outer ring for a constant velocity by a chemical composition, an effective hardened layer depth of a shaft part subjected to high frequency hardening and tempering, an old austenite crystal grain size, a surface hardness, a crystal grain size in a non-high frequency hardened inside, and a surface compression residual stress. Further, they have evaluated processabilities in the production steps of cold forging, machining work, drilling and serration work by rolling after hot forging based on a tool life and a serration dimensional accuracy. As a result thereof, the following knowledge have been obtained.

First, a torsional strength of a steel subjected to frequency hardening and tempering to a suitable depth depends upon the amounts of a lens-form martensite and a lath-form martensite (these terms were quoted from Martensite Transformation-Base, written by Y. Nishiyama, edited by Maruzern Co., Ltd., p. 9, FIG. 1.10) on the hardened surface, which are observed under a transmission type electron microscope, and carbides deposited in the inside and interface of the lath-form martensite.

All of a high frequency-hardened structure in a carbon steel having a carbon amount of 0.2% or less is composed of the lath-form martensite, and as carbon increases, the lens-form martensite appears. In a medium carbon steel, a mixed structure of the lath-form martensite and the lens-form martensite is formed. The formation of the lens-form martensite increases the hardness but provides a character to reduce the toughness. A high frequency-hardened structure in a carbon steel having a carbon amount exceeding 0.53% is composed only of the lens-form martensite and very hard but provides a character of a poor toughness.

Such difference in the characters of the martensite causes a change in the breaking form by applying a torque. That is, in the outer ring for a constant velocity joint having a serration part composed of a lens-form martensite structure in a steel having a carbon amount exceeding 0.53%, the application of a torque causes cracks from the surface of a serration gear tooth bottom on which a stress is concentrated, which results in principal stress rupture, and a broken face thereof presents a grain boundary fracture. The $\tau_{max}$ and $\tau_w$ in this breaking form are reduced very much.

On the other hand, the outer ring for a constant velocity joint having a serration part composed of suitable lath-form martensite and lens-form martensite and constituted from a structure in which uniformly deposited carbides are formed in the inside and boundary of the lath-form martensite has an excellent balance between a hardness and a toughness under the application of a torque. Accordingly, cracks are uniformly generated from the whole surface of a serration gear tooth bottom, which results in shearing stress rupture. In this case, the ruptured surface presents a ductile fracture. The $\tau_{max}$ and $\tau_w$ in this breaking form are larger than those of the principal stress rupture described previously.

A steel blended with suitable amounts of Cr and Mo is turned into a structure having an excellent balance between a strength and a toughness by causing carbides to deposit and grow in the inside and boundary of the lath-form martensite by tempering at 140° to 180° C.

Next, it has been found that the $\tau_{max}$ and $\tau_w$ provide the maximum values when a ratio (CD/R) of a hardened layer depth (an effective hardened layer depth in the end in which the hardness is 450 in HV) in the serration end in high frequency hardening to a radius R of the shaft part in the high frequency-hardened product is 0.35 to 0.60. Further, it has been found that the addition of a suitable amount of Mo not only provides an effect to obtain the preceding structure having an excellent balance between a strength and a toughness but also increases a compression residual stress in the high frequency-hardened surface part and raises a torsional fatigue strength $\tau_w$ by making old austenite crystal grains fine. In the present invention, old austenite crystal grains in the serration end after high frequency hardening have been controlled to 8 in terms of a JIS particle size number from such point of view.

Forging a steel blended with a suitable amount of Mo at temperatures falling in a range of 850° to 950° C. displays an action to make crystal grains of the forged crude fabricating material uniform and fine by a reduction in an intergranular energy of Mo. In the present invention, such crystal grain structure is called "regulated fine grain structure" when the JIS crystal grain number is 6 or more. In contrast with this, in a steel blended with no Mo, crystal grains thereof depend upon a forging work system. In particular, a part having a long contact time with a forging die tends to be of a mixed grain of fine grains and coarse grains or of coarse grains (for example, 1 to 5 in terms of a JIS crystal grain size classification), which originates in an accelerated cooling rate. Further, the hardness is raised by an increase in a super-cooled structure. Thus, a dimensional accuracy of serration by rolling the crude fabricating material in which uneven grain size, structure and hardness are present is deteriorated, which originates in the fact that the crude fabricating material does not uniformly plastically flow.

Further, it has been found that not only old austenite crystal grains present on a high frequency-hardened surface but also crystal grains present in the inside which is not hardened exert influences on the torsional strength $\tau_{max}$.

Accordingly, using a steel blended with a suitable amount of Mo to prepare the crude fabricating material of a complex form having a regulated fine grain structure by hot forging at temperatures falling in a range of 850° to 950° C. and then producing the product in the conditions prescribed in the present invention provide a very good processability in producing. In addition, the resulting outer ring for a constant velocity joint has an excellent torsional strength $\tau_{max}$ and torsional fatigue strength $\tau_w$.

It has been found by the present inventors that the torsional fatigue characteristics of the outer ring for a constant velocity joint can be raised to a large extent by suitably prescribing the chemical composition, processing conditions and the like based on the knowledge described above, and thus, the present invention has been completed. First, a reason for restricting the chemical composition in the present invention is discussed as in the following:

C: 0.45 to 0.53%;

C is an element controlling a strength, a toughness and a rupture form of a martensite structure in high frequency hardening. The content of less than 0.45% insufficiently forms the lens-form martensite controlling the strength and does not provide sufficiently high $\tau_{max}$ and $\tau_w$. On the other hand, the content of C exceeding 0.53% provides only the lens-form martensite which is hard and poor in a toughness. In particular, in the outer ring for a constant velocity joint having serration, principal stress rupture is caused in a serration part, and therefore the $\tau_{max}$ and $\tau_w$ are rather reduced. Further, the cold forging tool life and the drill tool life are markedly lowered.

Si: 0.05 to 0.25%

Si displays an effect for enhancing deoxidation and a hardening performance. The Al content of less than 0.05% is insufficient for this effect, and the Al content exceeding 0.25 5 saturates the effect. The excess addition thereof increases markedly the hardness of the crude fabricating material and makes the drill processing difficult.

Mn: 0.7 to 1.0%

The hardening performance has to be raised in order to secure a stability of high frequency hardening, and Mn is effective for increasing this hardening performance. This requires a content of Mn of 0.7% or more, but the content exceeding 1.0% makes drill processing difficult.

Al: 0.01 to 0.05%

Al has a deoxidizing effect and an effect for forming a compound AlN with N to prevent the crystal grains from coarsening in high frequency hardening. The content of less than 0.01% does not sufficiently provide these effects, and the content exceeding 0.05% saturates the effects. Accordingly, the content of Al has been controlled to 0.01 to 0.05%.

Mo: 0.2 to 0.4%

Mo is an element effective for providing a structure in which a strength is well balanced with a toughness by depositing carbides in the inside and boundary of the high frequency-hardened lath-form martensite. Also, Mo is an element necessary for increasing a compression residual stress on the high frequency-hardened surface part. Further, Mo provides as well an effect for uniforming and fining crystal grains present in the crude fabricating material forged at temperatures falling in a range of 850° to 950° C. and an effect for fining old austenite crystal grains present in the high frequency-hardened layer. The content of less than 0.02% insufficiently provides these effects, and the content-exceeding 0.4% increases too much a hardness of the crude fabricating material forged at 850° to 950° C. to markedly deteriorate a cold forging tool life and a drill tool life. Further, the effects corresponding to the content can not be obtained in either of $\tau_{max}$ and $\tau_w$.

N: 0.003 to 0.012%

N has an effect for forming a compound AlN with Al to prevent the crystal grains from coarsening in high frequency hardening. The content of less than 0.003% does not sufficiently provide the effect, and the content exceeding 0.012% saturates the effect. Accordingly, the content of N has been controlled to 0.003 to 0.012%.

The steel which is used as the raw material in the present invention has the chemical composition described above, wherein the balance comprises Fe and inevitable impurities. Cr, P, S and O contained in the above inevitable impurities have to be controlled as shown below.

Cr: 0.05% or less

Cr increases a hardness of the crude fabricating material forged at 850° to 950° C. and reduces a drill life. However, the amount of 0.05% or less provides practically no problems.

P: 0.015% or less

A reduction in P is effective for raising the torsional fatigue strength $\tau_w$, but the content exceeding 0.015% can not cause this effect to be expected. Accordingly, the content of P is controlled to 0.015% or less.

S: 0.01% or less

S is an element which forms a sulfide series inclusion to reduce a toughness of the high frequency-hardened layer and lowers the torsional fatigue strength $\tau_w$, and therefore S has to be lowered to 0.01% or less.

O: 0.002% or less

O exerts a large influence on the forms of impurities contained in a steel. In particular, inclusions such as $Al_2O_3$ and $SiO_2$ markedly reduce the $\tau_w$, and therefore oxide series inclusions have to be reduced to the utmost. An O amount of 0.02% or less provides practically no problems.

In the present invention, after a steel having the chemical composition described above is subjected to cold forging at temperatures falling in a range of 850° to 950° C., it is fabricated into a specified form as an outer ring for a constant velocity joint by cold forging, machining, cutting work such as drilling, and rolling work, and a ratio CD/R of an effective hardened layer depth CD in the serration end part to a shaft part radius R has to be controlled to 0.35 to 0.60 by high frequency hardening-tempering. The effective hardened layer depth CD and the shaft part radius R described above are based on a shaft part surface in which a cross section perpendicular to the shaft in the serration end is a circular part (that is, this surface corresponds to a position of a bottom in the serration part). That is, since fatigue cracks are the most liable to take place in the serration end, and if the characteristics in the above end are controlled, the characteristics in the whole serration part can almost be controlled as well, attentions have been paid to the characteristics in the serration end in the present invention.

In fabricating the outer ring for a constant velocity joint, a crude fabricating material is generally prepared by either method of cold forging alone, a combination of warm forging and cold forging, or a combination of hot forging and cold forging and then finished into the final specified form via cutting and rolling.

In the present invention, a crude fabricating material having a regulated fine grain structure is worked by hot forging at temperatures falling in a range of 850° to 950° C., and then the dimensional accuracy is raised by cold forging; further, the outside dimension of a shat part which is turned into a serration part and a screw part is settled by machining; subsequently, a pin hole is formed by drilling; and the serration part and the screw part are then worked by rolling.

In hot forging of the crude fabricating material, temperatures of lower than 850° C. necessitate a forging machine having a large capacity because of a too large deformation resistance of the steel while providing the excellent dimensional accuracy, and cause a problem on a forging tool life. On the other hand, hot forging temperatures exceeding 950° C. deteriorate a dimensional accuracy of the crude fabricating material and make it difficult to improve the dimensional accuracy by subsequent cold forging. Accordingly, in the present invention, the temperatures in hot forging have been controlled to 850° to 950° C. In the present invention, normalizing for a purpose of uniformizing and fining crystal grains contained in the crude fabricating material is not necessarily required to carry out before cutting work.

In the process of the present invention, the high frequency hardening conditions and the tempering conditions shall not specifically be restricted, but the values of the crystal grain size, the surface hardness and the ratio (CD/R) described above which are prescribed in the present invention have to be obtained. In the present invention, the crystal grain size has been controlled to 8 or more in terms of a JIS grain size number because the crystal grain size has to be fined to 8 or more in terms of the JIS grain size number in order to obtain the desired torsional fatigue strength. Further, the surface hardness in the serration end has been controlled to 720 or more in terms of HV because it is necessary for achieving a torsional strength of at least 1800 MPa or more.

In the present invention, a two stage shot peening treatment is provided to both ends of the serration part after high frequency hardening and tempering to increase the compression residual stress on the surface, whereby a torsional fatigue strength of the outer ring for a constant velocity joint can further be raised.

The shot peening in the first stage aims at forming the high compression residual stress to the depth, and this requires to carry out the shot peening in the conditions of a shot grain hardness of 750 or higher in terms of HV, a shot grain diameter of 0.5 to 1 mm, and a shot grain shooting rate of 60 m/second. In this case, the shot grain diameter exceeding 1 mm coarsens the surface of the member and lowers the fatigue strength.

On the other hand, the shot peening in the second stage aims at improving the surface roughness by using smaller shot grains than the shot grains used in the first stage to increase the compressing residual stress and the surface hardness on the surface. This requires to carry out the shot peening with shot grains having a shot grain hardness of 750 or higher in terms of HV and a shot grain diameter in a range of 0.2 to 0.5 mm and is smaller than those of the shot grains used in the first stage and control a surface compression residual stress of the member to 850 MPa or more. The surface compression residual stress of the member has been controlled to 850 MPa or more because the surface compression residual stress lower than this value does not notably increase the torsional fatigue strength $\tau_w$ at 100,000 cycles.

EXAMPLES

Next, the present invention shall more specifically be explained with reference to the following experimental results.

Steels having chemical compositions shown in Table 1 were molten by a conventional method and finished up into forged blanks having a major diameter of 55 mm and a length of 91.3 mm by cutting work after hot forging and normalizing. A1 to A9 steels shown in Table 1 are the steels of the present invention, and B1 to B11 steels are steels for comparison. The B1 steel is a conventional S53C steel.

Among the comparison steels, the B2 steel deviates from the lower limit of C content, and the B3 steel deviates from the upper limit of C content; the B4 steel deviates from the lower limit value of Si content, and the B5 steel deviates from the upper limit value of Si content; the B6 steel deviates from the lower limit of Mn content, and the B7 steel deviates from the upper limit of Mn content; the B8 steel deviates from the lower limit of Mo content, and the B9 steel deviates from the upper limit of Mo content; the B10 steel deviates from the upper limit of Cr content; and the B11 steel deviates from the upper limit of S content.

TABLE 1

| | Chemical composition (mass %) | | | | | | | | | Remark |
|---|---|---|---|---|---|---|---|---|---|---|
| | C | Si | Mn | P | S | Mo | Cr | Al | N | O | |
| A1 | 0.45 | 0.20 | 0.88 | 0.007 | 0.008 | 0.29 | 0.01 | 0.028 | 0.0055 | 0.0010 | Invention |
| A2 | 0.48 | 0.14 | 0.87 | 0.006 | 0.006 | 0.30 | 0.01 | 0.027 | 0.0057 | 0.0012 | |
| A3 | 0.53 | 0.05 | 0.88 | 0.007 | 0.005 | 0.30 | 0.01 | 0.028 | 0.0056 | 0.0011 | |
| A4 | 0.48 | 0.05 | 0.88 | 0.006 | 0.007 | 0.29 | 0.01 | 0.028 | 0.0055 | 0.0008 | |
| A5 | 0.48 | 0.25 | 0.88 | 0.009 | 0.006 | 0.30 | 0.01 | 0.029 | 0.0056 | 0.0012 | |
| A6 | 0.48 | 0.15 | 0.70 | 0.010 | 0.005 | 0.29 | 0.01 | 0.030 | 0.0058 | 0.0010 | |
| A7 | 0.48 | 0.20 | 1.00 | 0.009 | 0.006 | 0.30 | 0.01 | 0.027 | 0.0055 | 0.0012 | |
| A8 | 0.48 | 0.17 | 0.87 | 0.010 | 0.005 | 0.20 | 0.01 | 0.028 | 0.0058 | 0.0008 | |
| A9 | 0.48 | 0.05 | 0.75 | 0.006 | 0.005 | 0.40 | 0.01 | 0.026 | 0.0057 | 0.0009 | |
| B1 | 0.54 | 0.20 | 0.88 | 0.017 | 0.018 | 0.01 | 0.13 | 0.028 | 0.0055 | 0.0010 | Comparison |
| B2 | 0.44 | 0.23 | 0.79 | 0.012 | 0.006 | 0.01 | 0.01 | 0.029 | 0.0059 | 0.0014 | |
| B3 | 0.60 | 0.22 | 0.88 | 0.016 | 0.017 | 0.30 | 0.01 | 0.027 | 0.0060 | 0.0013 | |
| B4 | 0.48 | 0.01 | 0.88 | 0.010 | 0.016 | 0.30 | 0.01 | 0.028 | 0.0056 | 0.0015 | |
| B5 | 0.48 | 0.40 | 0.88 | 0.009 | 0.015 | 0.30 | 0.01 | 0.027 | 0.0057 | 0.0014 | |
| B6 | 0.48 | 0.17 | 0.65 | 0.010 | 0.014 | 0.30 | 0.01 | 0.026 | 0.0055 | 0.0012 | |
| B7 | 0.48 | 0.20 | 1.20 | 0.010 | 0.014 | 0.30 | 0.01 | 0.028 | 0.0057 | 0.0011 | |
| B8 | 0.48 | 0.18 | 0.85 | 0.009 | 0.015 | 0.10 | 0.01 | 0.030 | 0.0056 | 0.0013 | |
| B9 | 0.48 | 0.19 | 0.88 | 0.010 | 0.013 | 0.50 | 0.01 | 0.025 | 0.0059 | 0.0012 | |
| B10 | 0.48 | 0.20 | 0.87 | 0.013 | 0.019 | 0.32 | 0.30 | 0.028 | 0.0054 | 0.0013 | |
| B11 | 0.48 | 0.20 | 0.86 | 0.014 | 0.030 | 0.28 | 0.01 | 0.027 | 0.0060 | 0.0008 | |

Next, the forged blanks were worked to crude fabricating materials by combination of hot forging and cold forging and then finished up into outer rings for a constant velocity joint each having a serration part and a screw part in a shaft part by drilling and rolling work, wherein the steel A2 of the present invention and the steel B1 of comparison were subjected to hot forging at respective temperatures of 800° C., 850° C., 900° C., 950° C., and 1000° C., and the other steels at 900° C.

Figure 2:
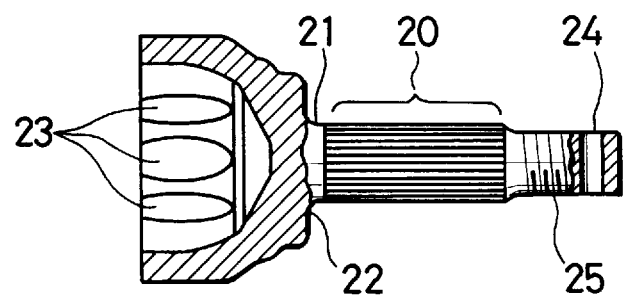
FIG. 2 is a partial cross sectional view of a finished outer ring for a constant velocity joint.

FIG. 1 is a drawing of the crude fabricating material for the outer ring for a constant velocity joint. Wherein 10 represents a serration work-corresponding part; 11 represents a part which is turned into a serration end; and 12 represents a pin hole-boring part, respectively. FIG. 2 is a sketch drawing of the finished outer ring for a constant velocity joint, wherein 20 represents a serration part; 21 represents a serration end; 22 represents a mouth joint part; 23 represents a mouth rolling part; 24 represents a pin hole; and 25 represents a screw part, respectively.

Finally, determined after forging were JIS crystal grain sizes observed in the serration work-corresponding part 10 and the part 11 which was the serration end resulting in a rupture position in a torsion test and a torsional fatigue test. The results thereof are shown in the following Table 2 (steels of the present invention) and Table 3 (steels of comparison), respectively. In Table 2 and Table 3, regulated fine grains were shown with a mark ◯, and coarse grains were shown with a mark ×.

TABLE 2

| Steel | Measuring Part | Forging temperature (°C.) | | | | |
|---|---|---|---|---|---|---|
| | | 800 | 850 | 900 | 950 | 1000 |
| A1 | 10 | — | — | ◯ | — | — |
| | 11 | — | — | ◯ | — | — |
| A2 | 10 | ◯ | ◯ | ◯ | ◯ | × |
| | 10 | ◯ | ◯ | ◯ | ◯ | × |
| A3 | 10 | — | — | ◯ | — | — |
| | 11 | — | — | ◯ | — | — |
| A4 | 10 | — | — | ◯ | — | — |
| | 11 | — | — | ◯ | — | — |
| A5 | 10 | — | — | ◯ | — | — |
| | 11 | — | — | ◯ | — | — |
| A6 | 10 | — | — | ◯ | — | — |
| | 11 | — | — | ◯ | — | — |
| A7 | 10 | — | — | ◯ | — | — |
| | 11 | — | — | ◯ | — | — |
| A8 | 10 | — | — | ◯ | — | — |
| | 11 | — | — | ◯ | — | — |
| A9 | 10 | — | — | ◯ | — | — |
| | 11 | — | — | ◯ | — | — |

TABLE 3

| Steel | Measuring Part | Forging temperature (°C.) | | | | |
|---|---|---|---|---|---|---|
| | | 800 | 850 | 900 | 950 | 1000 |
| B1 | 10 | ◯ | ◯ | ◯ | × | × |
| | 11 | ◯ | × | × | × | × |
| B2 | 10 | — | — | × | — | — |
| | 11 | — | — | × | — | — |
| B3 | 10 | — | — | ◯ | — | — |
| | 11 | — | — | ◯ | — | — |
| B4 | 10 | — | — | ◯ | — | — |
| | 11 | — | — | ◯ | — | — |
| B5 | 10 | — | — | ◯ | — | — |
| | 11 | — | — | ◯ | — | — |
| B6 | 10 | — | — | ◯ | — | — |
| | 11 | — | — | ◯ | — | — |
| B7 | 10 | — | — | ◯ | — | — |
| | 11 | — | — | ◯ | — | — |
| B8 | 10 | — | — | × | — | — |
| | 11 | — | — | × | — | — |
| B9 | 10 | — | — | ◯ | — | — |
| | 11 | — | — | ◯ | — | — |
| B10 | 10 | — | — | ◯ | — | — |
| | 11 | — | — | ◯ | — | — |
| B11 | 10 | — | — | ◯ | — | — |
| | 11 | — | — | ◯ | — | — |

The following considerations can be given from the results shown in Table 2 and Table 3. First, the A2 steel (steel of the present invention) blended with Mo is of regulated fine grains at temperatures falling in a range of 800° to 950° C. and of coarse grains at 1000° C. On the other hand, the B1 steel (steel of comparison) blended with no Mo is of regulated fine grains in the part 10 at forging temperatures of 900° C. or lower but of coarse grains at forging temperatures of 950° C. or higher. This B1 steel is of regulated fine grains in the part 11 at a forging temperature of 800° C. but of coarse grains at forging temperatures of 850° C. or higher.

In the steels of the present invention other than the A2 steel and the steels of comparison (B3 to 7 steels, B9 steel and B11 steel) blended with Mo, the crystal grains are regulated fine grains at a forging temperature of 900° C. in either of the parts 10 and 11. In contrast with this, in the steels of comparison (B2 steel and B8 steel) blended with no Mo, the crystal grains are coarse grains at a forging temperature of 900° C. in either of the parts 10 and 11.

It can be found from these facts that the crystal grains can be turned into regulated fine grains after forging at forging temperatures of 850° to 950° C. by blending them with a suitable amount of Mo.

Next, the shat part of the crude fabricating material which was forged at 900° C. or 1000° C. was finished up into a specified dimension by machining, and then the pin hole 24 shown in FIG. 2 was formed by drilling. This pin hole 24 was drill-worked by dry cutting in the conditions of a cutting rate of 20 m/min, a feed rate of 0.08 mm/rev and perforation by means of a 4 mmφ drill of SKH51. A number of the total holes bored until cutting was impossible was determined as a drill life.

Vickers hardnesses and drill lives in the boring part 12 in the crude fabricating material, which is the part of the pin hole 24 are shown in the following Table 4. The drill life of each steel was shown by a value relative to a drill life of the crude fabricating material obtained by forging the B1 steel at 900° C., which was set at 100. As apparent from the results shown in Table 4, it can be found that the drill life depends on the Vickers hardness.

TABLE 4

| Steel | Forging temperature (°C.) | Hardness (HV) | Drill life | Remark |
|---|---|---|---|---|
| A1 | 900 | 220 | 107 | Invention |
| A2 | 900 | 227 | 91 | |
| A2 | 1000 | 230 | 85 | Comparison |
| A3 | 900 | 237 | 73 | Invention |

TABLE 4-continued

| Steel | Forging temperature (°C.) | Hardness (HV) | Drill life | Remark |
|---|---|---|---|---|
| A4 | 900 | 219 | 109 | |
| A5 | 900 | 237 | 73 | |
| A6 | 900 | 221 | 104 | |
| A7 | 900 | 236 | 75 | |
| A8 | 900 | 215 | 120 | |
| A9 | 900 | 228 | 91 | |
| B1 | 900 | 223 | 100 | Comparison |
| B1 | 1000 | 228 | 91 | |
| B2 | 900 | 200 | 168 | |
| B3 | 900 | 277 | 30 | |
| B4 | 900 | 224 | 98 | |
| B5 | 900 | 250 | 54 | |
| B6 | 900 | 219 | 109 | |
| B7 | 900 | 247 | 58 | |
| B8 | 900 | 209 | 137 | |
| B9 | 900 | 260 | 44 | |
| B10 | 900 | 264 | 40 | |
| B11 | 900 | 229 | 87 | |

Dimensional accuracy in the serration part 20 are shown in the following Table 5 in terms of acceptance (◯) and rejection (×), wherein rolling diameters (diameters before rolling) were machined to a fixed dimension and then subjected to rolling; the dimensions in which a dispersion in the major diameter in a longitudinal direction in the full length 45 mm of the serration part 20 was less than 40 mm were marked with ◯, and those in which the dispersion was 40 mm or more was marked with ×. The results thereof are shown in the following Table 5. The principal items of the serration are a tooth number of 23, a module of 1.0, a pressure angle of 45 degree, a minor diameter of 22.2 mm, and a major diameter of 24.0 mm. With respect to the A2 steel of the invention and the B1 steel of comparison, dimensional accuracy of the products produced from the crude fabricating materials forged at 800° C., 850° C., 900° C., 950° C., and 1000° C. were determined. With respect to the other steels, dimensional accuracy of the products produced from the crude fabricating materials forged at 900° C. were determined.

TABLE 5

| Steel | Forging temperature (°C.) | | | | |
|---|---|---|---|---|---|
| | 800 | 850 | 900 | 950 | 1000 |
| A1 | — | — | ◯ | — | — |
| A2 | ◯ | ◯ | ◯ | ◯ | × |
| A3 | — | — | ◯ | — | — |
| A4 | — | — | ◯ | — | — |
| A5 | — | — | ◯ | — | — |
| A6 | — | — | ◯ | — | — |
| A7 | — | — | ◯ | — | — |
| A8 | — | — | ◯ | — | — |
| A9 | — | — | ◯ | — | — |
| B1 | ◯ | ◯ | ◯ | × | × |
| B2 | — | — | ◯ | — | — |
| B3 | — | — | ◯ | — | — |
| B4 | — | — | ◯ | — | — |
| B5 | — | — | ◯ | — | — |
| B6 | — | — | ◯ | — | — |
| B7 | — | — | ◯ | — | — |
| B8 | — | — | ◯ | — | — |
| B9 | — | — | ◯ | — | — |
| B10 | — | — | ◯ | — | — |
| B11 | — | — | ◯ | — | — |

As apparent from the results shown in Table 5, it can be found that while the B1 steel of comparison is stable in a serration dimensional accuracy at forging temperatures falling in a range of 800° to 900° C., the A1 steel of the invention is stable in a serration dimensional accuracy at forging temperatures falling in a range of 800° to 950° C. which is broader than the range described above. This is considered due to an influence synergistically exerted by a uniformity of the crystal grains present on the surface in the part 10 shown in FIG. 1 and a uniformity of the hardness. That is, it is considered that while the crude fabricating materials containing regulated fine grains and having a uniform hardness have a stable plastic flowability, the materials containing coarse grains as shown in Table 2 given above and having an uneven hardness due to a supercooled structure have an instabilized plastic flowability and a degraded serration dimensional accuracy.

The various steels described above were subjected to high frequency hardening-tempering in the serration part 20 and a part ranging from the serration end 21 to the mouth joint part 22 as shown in FIG. 2 by a fixed position-one shot hardening system to determine the torsional strength $\tau_{max}$ in the serration part 20 and the torsional fatigue strength $\tau_w$ obtained at 100,000 cycles based on "JASO C 304-89 Test of Constant velocity joint for Driving Shaft for Automobiles" settled by Automobile Technology Association.

In this case, in the A2 steel of the invention and the B1 steel of comparison, the ratio CD/R of the effective hardened layer depth CD to the shaft part radius R was varied in a range from 0.3 to 0.7 by changing the high frequency hardening conditions. The other steels were subjected to high frequency hardening-tempering in a condition in which the ratio CD/R was fixed at 0.50.

The crystal grain sizes in the serration end 21 before hardening and the forging temperatures are shown in the following Table 6 together with the material quantities in the high frequency hardened-tempered parts, that is, a CD/R, a surface hardness, an original austenite (old γ) crystal grain size and a surface compression residual stress. Further, the results of the torsional strength test and the torsional fatigue strength test are shown in Table 7. The evaluation results of a processability are shown together in this Table 7. Among the evaluation items for the processability, a criterion for evaluating the serration dimensional accuracy is the same as that shown in Table 5. With respect to a criterion for evaluating the drill life, the steels providing a drill life of 70 or more were marked with ◯ (acceptance), and those providing a drill life of less than 70 were marked with × (rejection), wherein the drill life of the B1 steel of comparison was set at 100.

TABLE 6

Material of a high frequency hardened-tempered part

| Test No. | Steel | Foging temperature (°C.) | Crystal grain size before hardening in end 21 | CD/R | Surface hardness (HV) | Old γ crystal grain size (JIS grain size No.) | Surface compression residual stress (MPa) |
|---|---|---|---|---|---|---|---|
| 1 | A1 | 900 | Regulated fine | 0.50 | 720 | 9.0 | −540 |
| 2 | A2 | 900 | Regulated fine | 0.30 | 735 | 10.5 | −560 |
| 3 | A2 | 1000 | Coarse | 0.35 | 735 | 10.5 | −540 |
| 4 | A2 | 900 | Regulated fine | 0.35 | 738 | 10.0 | −540 |
| 5 | A2 | 900 | Regulated fine | 0.50 | 740 | 9.0 | −580 |
| 6 | A2 | 900 | Regulated fine | 0.60 | 742 | 8.0 | −480 |
| 7 | A2 | 900 | Regulated fine | 0.70 | 740 | 6.0 | −375 |
| 8 | A3 | 900 | Regulated fine | 0.50 | 755 | 9.0 | −600 |
| 9 | A4 | 900 | Regulated fine | 0.60 | 720 | 8.0 | −480 |
| 10 | A5 | 900 | Regulated fine | 0.50 | 743 | 9.5 | −550 |
| 11 | A6 | 900 | Regulated fine | 0.50 | 730 | 8.3 | −500 |
| 12 | A7 | 900 | Regulated fine | 0.50 | 740 | 9.0 | −530 |
| 13 | A8 | 900 | Regulated fine | 0.50 | 740 | 10.0 | −550 |
| 14 | A9 | 900 | Regulated fine | 0.50 | 728 | 9.5 | −550 |
| 15 | B1 | 900 | Coarse | 0.30 | 755 | 8.0 | −450 |
| 16 | B1 | 1000 | Coarse | 0.40 | 760 | 7.0 | −400 |
| 17 | B1 | 900 | Regulated fine | 0.40 | 760 | 7.0 | −500 |
| 18 | B1 | 900 | Regulated fine | 0.50 | 760 | 5.5 | −400 |
| 19 | B2 | 900 | Coarse | 0.50 | 700 | 4.0 | −420 |
| 20 | B3 | 900 | Regulated fine | 0.50 | 780 | 8.0 | −500 |
| 21 | B4 | 900 | Regulated fine | 0.50 | 720 | 6.0 | −450 |
| 22 | B5 | 900 | Regulated fine | 0.50 | 740 | 9.0 | −500 |
| 23 | B6 | 900 | Regulated fine | 0.50 | 715 | 6.0 | −380 |
| 24 | B7 | 900 | Regulated fine | 0.50 | 740 | 9.0 | −500 |
| 25 | B8 | 900 | Coarse | 0.50 | 730 | 8.0 | −470 |
| 26 | B9 | 900 | Regulated fine | 0.50 | 740 | 10.0 | −480 |
| 27 | B10 | 900 | Regulated fine | 0.50 | 740 | 9.5 | −520 |
| 28 | B11 | 900 | Regulated fine | 0.50 | 740 | 9.0 | −580 |

TABLE 7

| Test No. | Torsional strength $\tau_{max}$ (MPa) | Torsional fatigue strength $\tau_w$ (MPa) | Processability Drill life | Processability Serration dimension | Remark |
|---|---|---|---|---|---|
| 1 | 1785 | 700 | ○ | ○ | Invention |
| 2 | 1700 | 670 | ○ | ○ | Comparison |
| 3 | 1650 | 680 | ○ | × | Comparison |
| 4 | 1830 | 690 | ○ | ○ | Invention |
| 5 | 1860 | 710 | ○ | ○ | Invention |
| 6 | 1860 | 695 | ○ | ○ | Invention |
| 7 | 1860 | 670 | ○ | ○ | Comparison |
| 8 | 1780 | 690 | ○ | ○ | Invention |
| 9 | 1800 | 690 | ○ | ○ | Invention |
| 10 | 1900 | 715 | ○ | ○ | Invention |
| 11 | 1800 | 690 | ○ | ○ | Invention |
| 12 | 1900 | 710 | ○ | ○ | Invention |
| 13 | 1830 | 690 | ○ | ○ | Invention |
| 14 | 1900 | 720 | ○ | ○ | Invention |
| 15 | 1580 | 630 | ○ | ○ | Comparison |
| 16 | 1460 | 660 | ○ | × | Comparison |
| 17 | 1620 | 660 | ○ | ○ | Comparison |
| 18 | 1640 | 590 | ○ | ○ | Comparison |
| 19 | 1540 | 680 | ○ | ○ | Comparison |
| 20 | 1650 | 600 | × | ○ | Comparison |
| 21 | 1780 | 670 | ○ | ○ | Comparison |
| 22 | 1820 | 710 | × | ○ | Comparison |
| 23 | 1600 | 660 | ○ | ○ | Comparison |
| 24 | 1860 | 700 | × | ○ | Comparison |
| 25 | 1800 | 670 | ○ | × | Comparison |
| 26 | 1860 | 780 | × | ○ | Comparison |
| 27 | 1880 | 745 | × | ○ | Comparison |
| 28 | 1700 | 650 | ○ | ○ | Comparison |

The following considerations can be given from the results shown above. First, the steels which do not satisfy the chemical composition requisites prescribed in the present invention, evaluated in Test No. 15, 17, 18, 19, 21, 23 and 28, while providing excellent processabilities, are inferior in a torsional strength and a torsional fatigue strength as compared with the steels of the invention satisfying all requisites of the present invention. The steels which do not satisfy the chemical composition requisites prescribed in the present invention, evaluated in Test No. 22, 24, 26 and 27 are inferior in a processability while having the torsional strengths and torsional fatigue strengths which are equivalent to or higher than those of the products of the invention. Further, the steel which does not satisfy the upper limit of the C content prescribed in the present invention, evaluated in Test No. 20 is inferior in a processability as well as product characteristics such as a torsional strength and a torsional fatigue strength.

Among the steels which had been subjected to high frequency hardening-tempering as described above, the A1 to A9 steels of the present invention and the B1 and B2 steels of comparison were subjected to two stage shot peening to both ends of the serration part 20. In this case, the conditions for the first stage shot peening were set to a shot grain diameter of 0.6 mm, a shot grain hardness of 810 HV, a shot grain initial rate of 90 m/sec, and a shooting time of 60 seconds, and the conditions for the second stage shot peening were set to a shot grain diameter of 0.3 mm, a shot grain hardness of 810 HV, a shot grain initial rate of 90 m/sec, and a shooting time of 60 seconds.

The surface compression residual stresses in both ends of the serration part 20 and the torsional fatigue strengths $\tau_w$ in the serration part 20 which were determined after the shot peening are shown in the following Table 8. It can be found that the steels which were subjected to the two stage shot peening to control the surface compression residual stresses in the both ends described above to 850 MPa or more have more excellent torsional fatigue strengths than those of the steels obtained without subjecting the B2 steel of comparison to the shot peening (Test No. 15 to 18 in Table 7 shown above). Further, it can be found that the steels which were subjected to the two stage shot peening to control the surface compression residual stresses to 850 MPa or more have torsional fatigue strengths which are raised to 760 MPa or more.

TABLE 8

| Test No. | Steel | Surface compression residual stress after shot peening (MPa) | Torsional fatigue strength after shot peening (MPa) | Remark |
| --- | --- | --- | --- | --- |
| 1 | A1 | −900 | 760 | Invention |
| 2 | A2 | −800 | 730 | Comparison |
| 3 | A2 | −600 | 720 | Comparison |
| 4 | A2 | −850 | 760 | Invention |
| 5 | A2 | −950 | 790 | Invention |
| 6 | A2 | −950 | 790 | Invention |
| 7 | A2 | −800 | 730 | Comparison |
| 8 | A3 | −900 | 760 | Invention |
| 9 | A4 | −950 | 760 | Invention |
| 10 | A5 | −950 | 800 | Invention |
| 11 | A6 | −950 | 760 | Invention |
| 12 | A7 | −970 | 790 | Invention |
| 13 | A8 | −1000 | 760 | Invention |
| 14 | A9 | −950 | 800 | Invention |
| 15 | B1 | −850 | 730 | Comparison |
| 16 | B1 | −900 | 720 | Comparison |
| 17 | B1 | −850 | 750 | Comparison |
| 18 | B1 | −800 | 710 | Comparison |
| 19 | B2 | −950 | 720 | Comparison |

The mouth rolling faces 23 in the steel A2 of the invention and the steel B1 of comparison were subjected to high frequency hardening-tempering in an effective hardened layer depth of 2 mm prescribed in 513 HV to carry out a rolling life test for the mouth rolling face 23. The results thereof are shown in the following Table 9. The rolling life was shown by a relative to that of the steel B1, which was set at 100. It can be found from the results shown in Table 9 that the rolling life of the outer ring for a constant velocity joint according to the present invention is equivalent to or higher than that of a conventional one.

TABLE 9

| Steel | Rolling life | Remark |
| --- | --- | --- |
| A2 | 105 | Invention |
| B1 | 100 | Comparison |

The present invention is constituted as described above, and the torsional fatigue characteristic thereof can be raised to a large extent. The outer ring for a constant velocity joint having a rolling life which is equivalent to or longer than those of conventional ones can be produced with a good processability.

What is claimed is:

1. An outer ring used for a high strength constant velocity joint having an involute serration part, a screw part, and a mouth part, the outer ring made of a steel containing:
   C: 0.45 to 0.53%, Si: 0.05 to 0.25%, Mn: 0.7 to 1.0%, Al: 0.01 to 0.05%, Mo: 0.2 to 0.4%, N: 0.003 to 0.012%, the remainder being Fe and inevitable impurities, the inevitable impurities including:
   Cr: 0.05% or less than 0.05%, P: 0.015% or less than 0.015%, S: 0.01% or less than 0.01%, and O: 0.002% or less than 0.002%,
   wherein an original austenite crystal grain at an involute serration end towards the mouth part is 8 or more in JIS grain size classification; a surface hardness at the involute serration end is 720 or more in Hv; and a ratio (CD/R) is 0.35 to 0.60 where CD is an effective hardened layer depth at which an inner hardness at the involute serration end is 450 in Hv and R is a radius of a shaft part of the involute serration part.

2. An outer ring for a high strength constant velocity joint as defined in claim 1, wherein surface compression residual stresses at the involute serration end towards the mouth part and an involute serration end towards the screw part of said involute serration part are 850 MPa or higher.

3. A process for producing an outer ring for high strength constant velocity joint, comprising the steps of:
   forging a steel including C: 0.45 to 0.53%, Si: 0.05 to 0.25%, Mn: 0.7 to 1.0%, Al: 0.01 to 0.05%, Mo: 0.2 to 0.4%, N: 0.003 to 0.012%, and the remainder being Fe and inevitable impurities and the inevitable impurities including: Cr: 0.05% or less, P: 0.015% or less, S: 0.01% or less, and O: 0.002% or less at temperatures in a range of 850° to 950° C. to turn the steel into a crude fabricating material having a regulated fine grain structure,
   then subjecting said material to cold forging, cutting work and rolling work to fabricate the material into a specified form having an involute serration part, a screw part, and a mouth part and then,
   subjecting the involute serration part to high frequency hardening and tempering to control an original austenite crystal grain at an involute serration end towards the mouth part to 8 or more in a JIS grain size number and a surface hardness at said involute serration end 720 or more in HV and set a ratio (CD/R), where CD is an effective hardened layer depth in which an inner hardness at said involute serration end is 450 in HV and R is a radius of a shaft part of the involute serration part, to 0.35 to 0.60.

4. A process for producing an outer ring for a high strength constant velocity joint as defined in claim 3, further comprising the steps of:
   subjecting the involute serration end towards the mouth part and an involute serration end towards the screw part of the involute serration part in the outer ring for a high strength constant velocity joint to shot peening with shot grains having a grain hardness of 750 or more in HV and a grain diameter of 0.5 to 1 mm at a shot grain shooting rate of 60 m/sec or more and then,
   subjecting said involute serration end towards the mouth part and said involute serration end towards the screw part to the shot peening with shot grains having a grain hardness of 750 or more in HV and a grain diameter in a range of 0.2 to 0.5 mm to thereby control the surface compression residual stresses at said involute serration end towards the mouth part and said involute serration end towards the screw part to 850 MPa or higher.

* * * * *